(12) United States Patent
Augesky (10) Patent No.: US 9,755,504 B2
(45) Date of Patent: *Sep. 5, 2017

(54) FLUX CONVERTER WITH POWER FACTOR CORRECTION

(75) Inventor: Christian Augesky, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 945 days.

This patent is subject to a terminal disclaimer.

(21) Appl. No.: 13/513,033

(22) PCT Filed: Nov. 22, 2010

(86) PCT No.: PCT/EP2010/067878
§ 371 (c)(1),
(2), (4) Date: May 31, 2012

(87) PCT Pub. No.: WO2011/067128
PCT Pub. Date: Jun. 9, 2011

(65) Prior Publication Data
US 2012/0236608 A1 Sep. 20, 2012

(30) Foreign Application Priority Data
Dec. 2, 2009 (AT) .................. A1907/2009

(51) Int. Cl.
*H02M 1/42* (2007.01)

(52) U.S. Cl.
CPC ......... *H02M 1/4258* (2013.01); *Y02B 70/126* (2013.01); *Y02P 80/112* (2015.11)

(58) Field of Classification Search
CPC .......... H02M 1/44; H02M 5/12; H02M 3/335; G05F 1/14; Y02B 70/126
(Continued)

(56) References Cited

U.S. PATENT DOCUMENTS 4,280,174 A * 7/1981 Sonda .............................. 363/24
4,736,284 A 4/1988 Yamagishi et al.
(Continued)

FOREIGN PATENT DOCUMENTS

CN 1521928 8/2004
CN 101207960 6/2008
(Continued)

OTHER PUBLICATIONS

Zhang Feng, Zhang Xiubin School of Electrical & Information Engineering Shanghai Jiaotong University Shanghai, Chia 200030, Tamotsu-Ninomiya; Jin Chunfeng, School of Information Science & Electrical Engineering Kyushu University, Fuknoka, Japan 812-8581; "A Novel Common-source Type Single-stage PFC Converter" The 4th International Power Electronics and Motion Control Conference; 2004, IPEMC, Band 3; Seiten 1080-1084, Kapitel II, III.

*Primary Examiner* — Emily P Pham
*Assistant Examiner* — Shahzeb K Ahmad
(74) *Attorney, Agent, or Firm* — Cozen O'Connor (57) ABSTRACT

A flux converter for converting an input-side alternating current into an output-side DC current, wherein a power factor correction is provided and the flux converter comprises a transformer having at least two serially arranged primary windings and a secondary winding wound in same direction. In addition, a first switch is used to switch a storage capacitor in series with a first primary winding to the alternating current in a clocked manner via rectification elements and a second primary winding can be switched to the storage capacitor in a clocked manner by a second switch.

15 Claims, 4 Drawing Sheets

(58) Field of Classification Search
USPC .............. 363/22, 44, 133, 134, 20–21.12;
323/247, 255, 256, 259
See application file for complete search history.

(56) References Cited

U.S. PATENT DOCUMENTS

| | | | |
|---|---|---|---|
| 5,224,025 | A | 6/1993 | Divan et al. |
| 5,301,095 | A | 4/1994 | Teramoto et al. |
| 5,751,561 | A * | 5/1998 | Ho et al. .................... 363/21.02 |
| 5,757,626 | A | 5/1998 | Jovanović et al. |
| 2003/0227784 | A1 | 12/2003 | Qiao et al. |
| 2004/0156217 | A1 | 8/2004 | Phadke |
| 2004/0252528 | A1* | 12/2004 | Kuwabara ................. 363/21.07 |
| 2009/0316444 | A1* | 12/2009 | Yamaguchi et al. ....... 363/21.12 |
| 2010/0232180 | A1* | 9/2010 | Sase et al. ..................... 363/17 |
| 2012/0230068 | A1* | 9/2012 | Augesky ......................... 363/44 |

FOREIGN PATENT DOCUMENTS

| | | |
|---|---|---|
| CN | 101572490 | 11/2009 |
| JP | 4244781 | 9/1992 |
| JP | 4265666 | 9/1992 |
| JP | 2001119934 | 4/2001 |
| RU | 2269859 | 2/2006 |

* cited by examiner

FLUX CONVERTER WITH POWER FACTOR CORRECTION

CROSS-REFERENCE TO RELATED APPLICATIONS

This is a U.S. national stage of application No. PCT/EP2010/067878 filed 22 Nov. 2010. Priority is claimed on Austrian Application No. A1907/2009 filed 2 Dec. 2009, the content of which is incorporated herein by reference in its entirety.

BACKGROUND OF THE INVENTION

1. Field of the Invention

The invention relates to flux converters and, more particularly, to a flux converter for converting an input-side AC voltage into an output-side DC voltage to provide a power factor correction. The invention furthermore relates to a method for operating such a flux converter.

2. Description of the Related Art

Generally, converters used in normal network power supplies exhibit input currents having significant harmonics or a power factor well below one. The reason for this lies in the requirement to recharge a storage capacitor on the DC side by a two-way rectifier. Short, needle-shaped current peaks are the result. Without additional measures, the level of these current peaks is limited only by the internal resistances of an input-side network, a network filter, a rectifier and a storage capacitor.

Power supplies on a single-phase power network, i.e., those having fairly high through-ratings (e.g., 200 W and above), require a special design to meet applicable technical specifications. These design measures can comprise a considerable proportion of the cost of a power supply. In addition, the overall size and the degree of efficiency are negatively influenced as a consequence of additional power losses.

In order to reduce a proportion of interference harmonics with regard to the current draw of a converter, a power factor correction (PFC) is provided in accordance with the prior art.

A passive power factor correction is achieved by a high input inductance. A high inductance value is necessary to substantially increase the conduction angle during a recharging phase. This only makes sense in the case of low power outputs because otherwise the corresponding chokes are too large and heavy. In addition to the costs of the chokes, their power loss must be taken into consideration.

This conventional method is not well suited for wide input voltage ranges on account of the variance in the maximum input current associated therewith.

Alternatively, it is known to use an active power factor correction, where a separate converter stage readjusts the current drawn to the timing profile of a sinusoidal network voltage. Generally, such active PFC circuits are designed as step-up converters and are connected directly downstream of a rectifier. These step-up converters charge a large capacitor up to a voltage in excess of the peak voltage of the AC input voltage. The step-up converter operates at a significantly higher frequency than a network supply, which means that a considerably smaller inductance is required. An almost continuous current flow having a low current ripple is produced, whereby the average current is adjusted by a control circuit to the instantaneous value of the network voltage.

Compared with a passive power factor correction, although an active PFC circuit is more complex, greater degrees of efficiency and an improved suppression of harmonics are however possible. In addition to the complexity, a disadvantage is the output voltage of such a PFC circuit, which in principle exceeds the maximum network voltage, as a result whereof problems can occur primarily with regard to high network input voltages in respect of component loadings and insulation voltages.

Instead of a step-up converter, an active PFC circuit can comprise a step-down converter, at which an output voltage less than the network voltage is present. The possible conduction angle decreases as a result, however. The energy input into a storage capacitor can only occur with a network voltage greater than the voltage at the storage capacitor. In addition, the current ripple is higher than in the case of a solution with a step-up converter and the activation of a power switch on the ground side is simpler with a step-up converter.

Active PFC circuits have the disadvantage that they must be provided in addition to the actual converter. Compared with converters not having PFC functionality, this means significant additional expenditure and additional losses.

SUMMARY OF THE INVENTION

It is therefore an object of the invention to provide a flux converter for converting an input-side AC voltage into an output-DC voltage.

This and other objects and advantages are achieved in accordance with the invention by a converter and a method for operating the converter in which the flux converter comprises a transformer having at least two serially arranged primary windings and a secondary winding wound in the same direction, whereby a storage capacitor in series with a first primary winding can be switched to the AC voltage in a clocked manner by rectification elements by a first switch and whereby a second primary winding can be switched to the storage capacitor in a clocked manner by a second switch. The invention is therefore based fundamentally on the functional principle of a forward converter as a DC/DC converter. The functional principle of the forward converter is combined with that of a step-down switching regulator, whereby however no additional inductance is used. In this manner, a converter is specified by which energy is transferred in a particularly low-loss manner from the input to the output with a controllable power factor correction.

A PFC functionality is achieved without the addition of a further converter stage and without a further large inductance.

A further advantage consists in the fact that the voltage present at the first switch and at the first primary winding corresponds only to the difference between the rectified input voltage and the voltage at the storage capacitor. The loading on these components is accordingly kept low even in the case of high input voltages. It is thereby also possible to reduce the resource requirement needed to provide protection against network power transients.

A very wide input voltage range is covered through suitable adjustment of the voltage at the storage capacitor to the input voltage. The voltage at the storage capacitor is preset at a low level for a low input voltage and a high level for a high input voltage. A wide-range capability without switching is therefore given, in other words without the need to provide a voltage doubler.

In accordance with the method of the invention, in a first conducting phase of a work cycle, energy introduced on the input side is transferred through the first primary winding to the secondary side and stored in the storage capacitor, and in a second conducting phase electrical, energy is transferred from the storage capacitor through the second primary winding to the secondary side. The transfer of the energy from the primary side to the secondary side therefore occurs either by way of the first or by way of the second primary winding through the magnetic coupling with the secondary winding. In this situation, during the transfer through the first primary winding, energy is simultaneously stored in the storage capacitor. This stored energy is transferred through the second primary winding to the secondary side. This mode of operation produces a wide conduction angle whilst simultaneously limiting the current consumed on the input side.

In an advantageous embodiment of the converter, a filter capacitor unit is provided which is connected to a conductor of the AC voltage and downstream of which are arranged rectification elements. Here, the filter capacitor unit is used for smoothing purposes and is designed to be smaller than normal buffer input capacitors.

It is advantageous for the secondary-side configuration of the flux converter if an output capacitor is connected to the secondary winding by a secondary-side rectifier circuit and a secondary-side flux choke, and if the output capacitor is connected by a secondary-side freewheeling diode to the secondary-side flux choke. This secondary-side rectifier circuit expediently consists of a rectifier diode.

On the primary side, in an advantageous embodiment provision is made such that a primary-side freewheeling diode is arranged parallel to the series circuit consisting of the storage capacitor and the first primary winding. Here, the first primary winding forms a step-down switching regulator with the first switch, the primary-side freewheeling diode and the storage capacitor.

In an alternative embodiment, a freewheeling path having a primary-side freewheeling diode taps the first primary winding to expand the scope for dimensioning, or the conduction angle. In a further alternative embodiment, the first primary winding and a first auxiliary winding are magnetically coupled and the first auxiliary winding is arranged in series with a primary-side freewheeling diode in parallel to the storage capacitor.

In another advantageous embodiment of the invention, a link between the two primary windings is connected to one terminal of the storage capacitor, where the second terminal of the storage capacitor is connected to a reference potential, and a series circuit consisting of the second primary winding and the second switching element is arranged parallel to the storage capacitor. This simple configuration permits simple dimensioning of the individual components and a compact construction.

In a further embodiment, a second diode is arranged in series with the second switching element, the conducting direction of which is opposite to the conducting direction of a parallel diode of the second switch. For component-related reasons, parallel diodes are sometimes contained in the switches used.

For the purpose of simple regulation, it is advantageous if a first current sensing resistor is arranged between the second terminal of the storage capacitor and the reference potential and if a second current sensing resistor is arranged between the second switch and the second terminal of the storage capacitor. A comparator then suffices to measure the primary-side current. In this situation, either a first primary-side current flows through the storage capacitor and the first current sensing resistor or a second primary-side current flows through the second switch and the second current sensing resistor, without one affecting the other.

During operation of the converter, provision is advantageously made that during a conducting phase, at the beginning, the first switch is switched on and the second switch is switched off, and subsequently the second switch is switched on and the first switch is switched off and the second switch remains switched on until a time at which a current through the second switch reaches a predetermined threshold value. The control of the energy transferred is therefore effected by way of the primary-side current, whereby the threshold value thereof is predetermined by a secondary-side voltage regulation.

In this situation, it is furthermore advantageous if the ratio between the on-time periods of the first switch and second switch is regulated such that the voltage at the storage capacitor remains constant on average. The voltage balance in the storage capacitor is therefore regulated independently of the secondary-side voltage regulation and the shutdown control of the primary-side current. The control variable of this second slower control circuit forms the on-time period for the first switch.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be described in an exemplary manner in the following with reference to the attached figures in which.

DETAILED DESCRIPTION OF THE PREFERRED EMBODIMENTS

Figure 1:
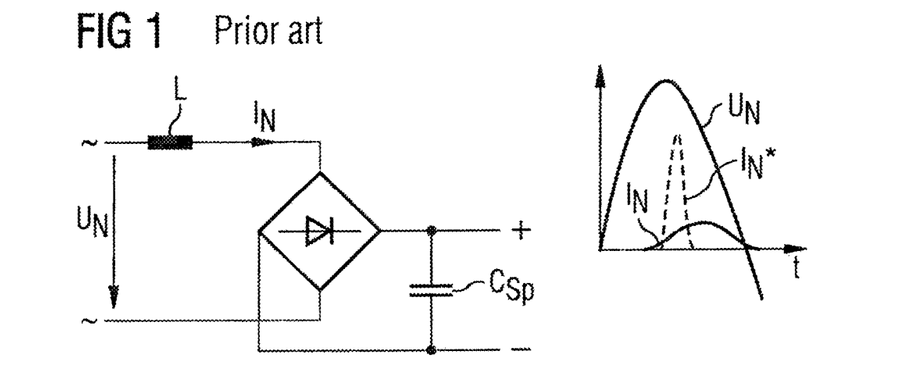
FIG. 1 shows a converter circuit having an input inductance in accordance with the prior art.
Figure 2A:
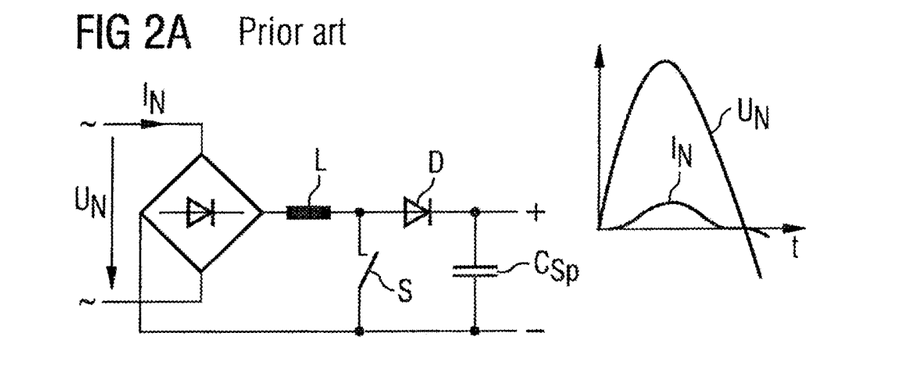
FIG. 2a shows an active PFC circuit designed as a step-up converter in accordance with the prior art.
Figure 2B:
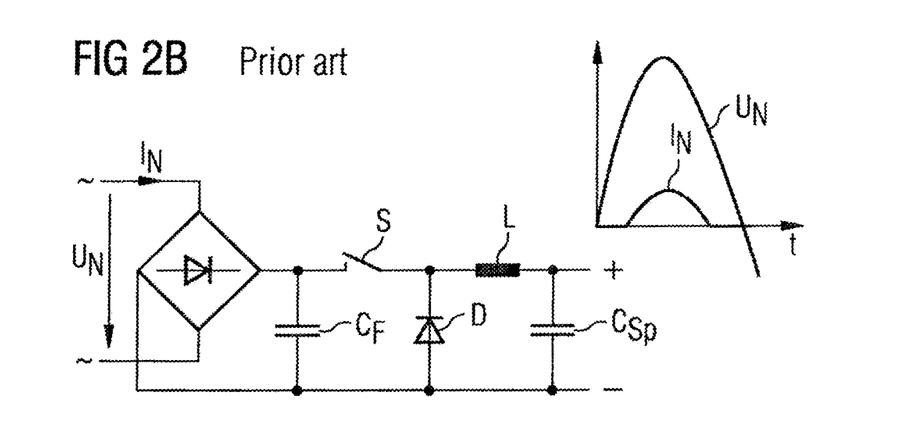
FIG. 2b shows an active PFC circuit designed as a step-down converter in accordance with the prior art.
Figure 3:
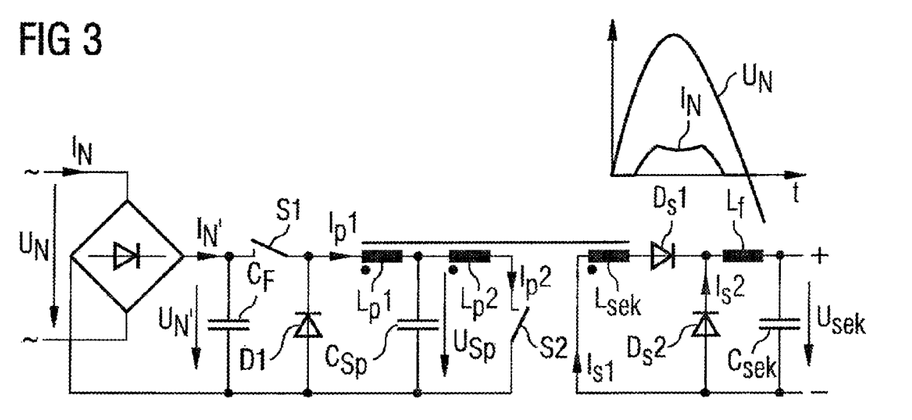
FIG. 3 shows an exemplary embodiment of a flux converter in accordance with the invention.

FIGS. 1-3 show conventional PFC circuits which convert an AC input voltage into a DC voltage of an intermediate circuit. With regard to a passive circuit (FIG. 1), a sufficiently large inductance L is arranged upstream of a rectifier unit. The conduction angle is increased in this manner compared with the original current profile $I_N^*$, whereby a phase displacement however occurs which is to be taken into consideration.

The conventional active circuits (FIGS. 2a and 2b) comprise a clocked switch S by which it is possible to also influence the phasing of the current $I_N$ in addition to the conduction angle.

The flux converter illustrated in FIG. 3 comprises an input-side rectifier bridge which is connected to an AC voltage $U_N$ and converts an AC current $I_N$ into a rectified current $I_N'$. Connected downstream of the rectifier bridge is a filter capacitor $C_F$ which is small in dimension in respect of the frequency of the AC voltage $U_N$. This filter capacitor $C_F$ can advantageously also be arranged upstream of the rectifier bridge, which serves to exclude any charging resulting from energy flowing back from the converter.

The flux converter also includes a transformer having two primary windings $L_p1$, $L_p2$ and a secondary winding $L_{sek}$. The start of the first primary winding $L_p1$ is connected by a first switch S1 to the output of the rectifier bridge. With the first switch S1 closed, a first primary current $I_p1$ flows through the first primary winding $L_p1$. The end of this first primary winding $L_p1$ is connected to the start of the second primary winding $L_p2$, where a connection point between these primary windings $L_p1$, $L_p2$ is connected to a terminal of a storage capacitor $C_{Sp}$. The second terminal of this storage capacitor $C_{Sp}$ is connected to a primary-side reference potential.

The end of the second primary winding $L_p2$ is likewise connected to the reference potential by a second switch S2, which means that the series circuit consisting of the second primary winding $L_p2$ and a second switch S2 is connected parallel to the storage capacitor $C_{Sp}$. With the second switch S2 closed, a second primary current $I_p2$ flows through the second primary winding $L_p2$.

In addition, a primary-side freewheeling diode D1 is provided which is arranged parallel to the series circuit consisting of first primary winding $L_p1$ and storage capacitor $C_{Sp}$.

A coupling exists by way of a core of the transformer between the primary windings $L_p1$, $L_p2$ and the secondary winding $L_{sek}$. The voltage induced in the secondary winding $L_{sek}$ produces a secondary-side current $I_{sek}$ which, by way of a rectifier diode $D_s1$ and a flux choke $L_f$, charges a secondary-side output capacitor $C_{sek}$. The output voltage $U_{sek}$ is present at this output capacitor $C_{sek}$.

During a shutdown phase the, flux choke $L_f$ continues to drive the secondary-side current by a secondary-side freewheeling diode $D_s2$.

The converter produces a profile of the input-side current $I_N$ such that briefly no current $I_N$ flows only in the region of the zero-crossings of the AC voltage $U_N$. Between these the current $I_N$ rises, where a reduction of the current $I_N$ occurs in the region of the highest voltage $U_N$, which means that the current profile overall is flattened.

The current draw from a network connected on the input side does not therefore occur in the form of a network-synchronous sine function, but current peaks are avoided and the conduction angle is greatly increased, which means that current harmonics remain below required limit values.

Figure 4:
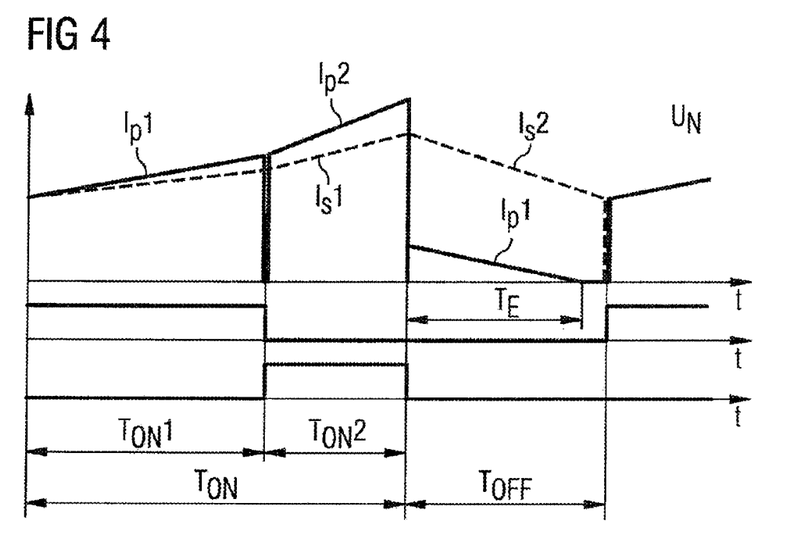
FIG. 4 shows a current diagram with switching states of the switches of the flux converter of FIG. 3.

The current profiles illustrated in FIG. 4 result from the regulation performed by the converter. A secondary-side voltage regulation predetermines a threshold value $I_{p\;soll}$ for the primary-side current $I_p1$ or $I_p2$. At the beginning of a conducting phase, the first switch S1 is switched on. The first primary current $I_p1$ through the first primary winding $L_p1$ rises until the first switch S1 is switched off again after an on-time period $T_{ON}1$ predetermined by a second control circuit. In this situation, the second control circuit determines the voltage level of the storage capacitor $C_{Sp}$ and keeps this constant on average.

At the same time as the first switch S1 is switched off, the second switch S2 is switched on. In this situation, it is advantageous to provide a slight overlap rather than a time gap between the on-time states. While the second switch S2 remains switched on $T_{ON}2$, the second primary current $I_p2$ flows through the second primary winding $L_p2$ and rises until the predetermined threshold value $I_{p\;soll}$ is reached. The conducting phase is then terminated by switching off the second switch S2.

On the secondary side, a first secondary-side current $I_s1$ flows through the secondary winding during a conducting phase as a result of the magnetic coupling of the transformer. In this situation the transformer is magnetized by a part of the primary-side current, whereby a difference results during the conducting phase between primary-side $I_p1$ or $I_p2$ and the secondary-side current $I_s1$ divided by the transformation ratio of the transformer. In this situation the transformation ratio is the ratio of a primary winding $L_p1$ or $L_p2$ to the secondary winding $L_{sek}$.

During the off-time period $T_{OFF}$ when both switches S1, S2 are in the off state, no energy is transferred through the transformer. The transformer is demagnetized in this situation. The period $T_E$ of demagnetization is shorter than the off-time period $T_{OFF}$, which is ensured by appropriate dimensioning of the winding ratios or an additional demagnetization winding.

The secondary-side flux choke $L_F$ continues to drive the secondary-side current $I_{sek}$ during the off-time period $T_{OFF}$, whereby said current decreases linearly until the first switch S1 switches on again.

Figure 5:
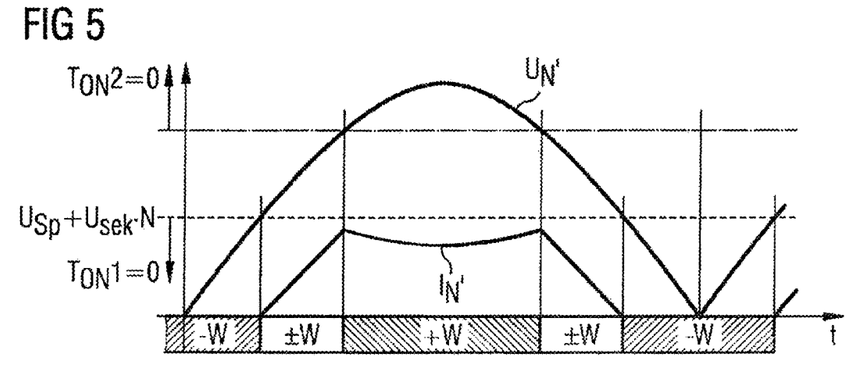
FIG. 5 shows a profile of the input current and the input voltage of the flux converter of FIG. 4.

FIG. 5 shows the profile of the rectified input voltage $U_N'$ and of the current $I_N'$ at a stable load point. Illustrated are the possible time segments in which energy W is either taken from or delivered to the storage capacitor $C_{Sp}$. At a stable load point, given a suitable setting of the maximum on-time period $T_{ON}1$ of the first switch S1, an even energy balance results in the storage capacitor $C_{Sp}$. In those phases in which the input-side voltage $U_N'$ is less than the sum of the voltage $U_{Sp}$ at the storage capacitor $C_{Sp}$ and the secondary-side voltage $U_{sek}$ multiplied by the transformation ratio N of the transformer, the energy is taken entirely from this storage capacitor $C_{Sp}$.

If the input-side voltage $U_N'$ becomes greater than the sum of the voltage $U_{Sp}$ at the storage capacitor $C_{Sp}$ and the secondary-side voltage $U_{sek}$ multiplied by the transformation ratio N of the transformer, the energy input occurs initially both from a connected network on the input side and also from the storage capacitor $C_{Sp}$. The corresponding current profile is illustrated in FIG. 4. As the input-side voltage $U_N'$ increases further, the energy input occurs entirely from the network, whereby the current threshold value $I_{p\;soll}$ predetermined by the secondary-side voltage regulation is already reached within the on-time period $T_{ON}1$ of the first switch.

The specification for the desired voltage $U_{sp}$ at the storage capacitor $C_{Sp}$ is based on strategic considerations. Criteria in this situation are a reduction of the voltage at the first switch S1, utilization of the stored energy for network failure bridging, optimization of the conduction angle, a controlled startup on switching on or optimization of the switching conditions for voltage-free switching.

Figure 6A:
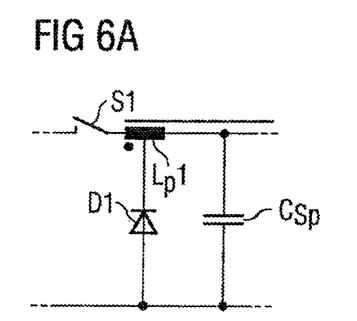
FIG. 6a shows a primary-side freewheeling path with tapping of the first primary winding of the flux converter of FIG. 4.
Figure 6B:
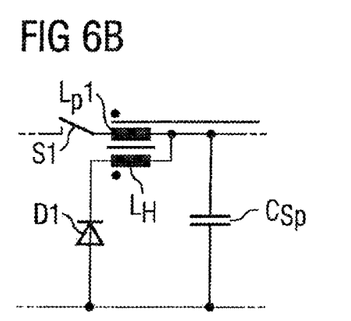
FIG. 6b shows a primary-side freewheeling path with auxiliary winding coupled to the first primary winding of the flux converter of FIG. 4.

Advantageous embodiments of a primary-side freewheel are illustrated in FIGS. 6a and 6b. For example, the first primary winding $L_p1$ has a divided configuration (FIG. 6a) and the freewheeling path with the primary-side freewheeling diode D1 is connected at the division point, in other words the first primary winding $L_p1$ is tapped by freewheel. Alternatively, an auxiliary winding $L_H$ is arranged in the freewheel as an additional demagnetization winding (FIG. 6b). This auxiliary winding $L_H$ is coupled magnetically with the first primary winding $L_p1$ and exhibits the same winding direction in this situation. The purpose of these measures is to expand the scope for dimensioning, or the conduction angle.

Figure 7:
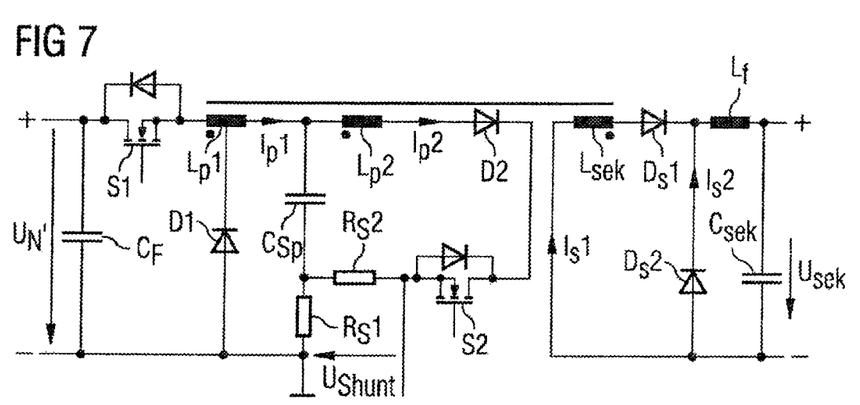
FIG. 7 shows an exemplary embodiment of the flux converter of FIG. 3 with switches designed as MOS-FETs.

A practical implementation of a converter in accordance with FIG. 3 is illustrated in FIG. 7. With switches S1, S2 comprising MOS-FETs, the parallel diodes thereof which are dependent on the technology involved must specifically be taken into consideration, i.e., in series with the second switch S2 this is necessary to prevent a short-circuit of the second primary winding $L_p2$ during startup. During startup, the storage capacitor voltage $U_{Sp}$ is still almost zero or very small compared with the difference voltage between input-side voltage $U_N'$ and storage capacitor voltage $U_{Sp}$. A second diode D2 is therefore provided, the cathode of this second diode (D2) is connected to the cathode of the parallel diode in the second switch S2. The primary-side freewheeling path with the primary-side freewheeling diode D1 taps into the first primary winding $L_p1$.

In order to configure the regulation of the primary current $I_p1$ or $I_p2$ in a simple manner, an arrangement of current sensing resistors $R_S1$, $R_S2$ is provided at which a measurement voltage $U_{Shunt}$ drops off. As a result, it is possible using only one comparator to detect the primary-side current, which either flows as a first primary current $I_p1$ through the capacitor $C_{Sp}$ and a first current sensing resistor $R_S1$, or flows as a second primary current $I_p2$ through the second switch S2 and a second current sensing resistor $R_S2$, without any mutual interference. By means of a favorable dimensioning of the current sensing resistors $R_S1$, $R_S2$, it is also possible to compensate for a different number of windings on the two primary windings $L_p1$, $L_p2$.

The input-side filter capacitor $C_F$ is dimensioned such that the voltage at this capacitor $C_F$ does not drop off by more than a predetermined voltage value (for example 10V) during a switching period of the converter having a duration of approx. 3-20 μs. A small filter capacitor $C_F$ having a capacitance of a few microfarads is therefore sufficient to provide an input-side voltage $U_N'$ having sufficient rigidity for the converter. Together with a network filter, optimized for the switching frequency, upstream of the input-side rectification elements, the requirements for the filtering of high-frequency network disruptions are therefore also satisfied.

The secondary side of the converter illustrated in FIG. 7 corresponds to the illustration in FIG. 3.

Figure 8:
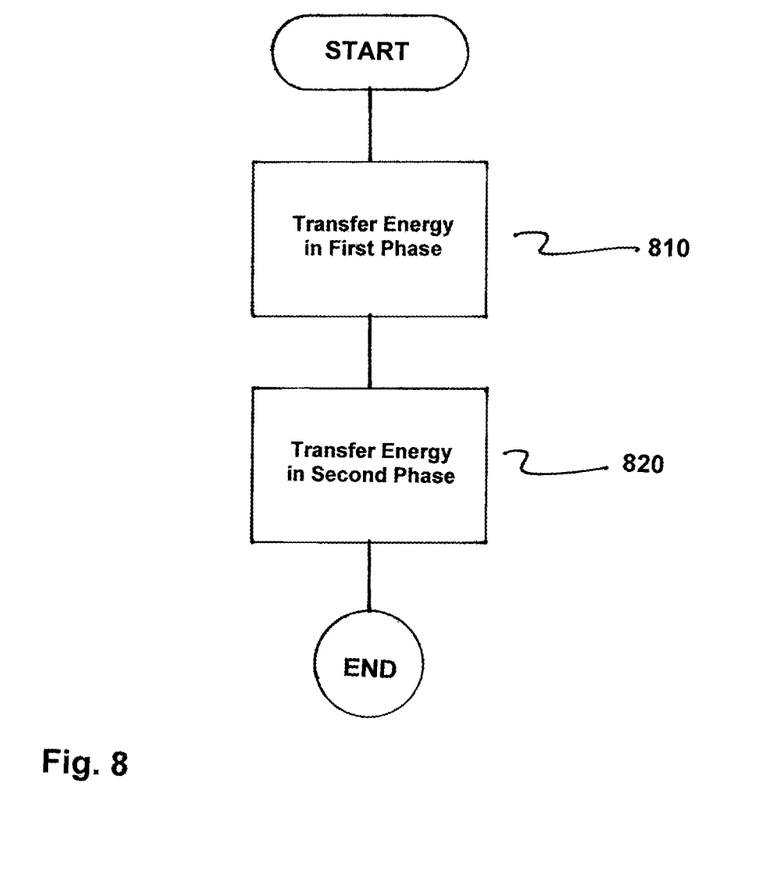
FIG. 8 is a flowchart of the method in accordance with an embodiment of the invention.

FIG. 8 is a flowchart of a method for operating a flux converter for converting an input-side AC voltage into an output-side DC voltage to provide a power factor correction including a transformer having a plurality of serially arranged primary windings, a secondary winding wound in a same direction as the plurality of serially arranged primary windings, a storage capacitor in series with a first primary winding of the at plurality of serially arranged primary windings, a first switch for switching the storage capacitor to the input-side AC voltage in a clocked manner by rectification elements and a second switch for switching a second primary winding of the plurality of serially arranged primary windings to the storage capacitor in a clocked manner.

The method comprises transferring, through a first primary winding of the at least two primary windings, electrical energy introduced on the input side to a secondary side of the flux converter in a first conducting phase of a work cycle and storing the transferred energy in the storage capacitor, as indicated in step 810.

Electrical energy from the storage capacitor is then transferred through a second primary winding of the plurality of primary windings to the secondary side of the flux converter in a second conducting phase, as indicated in step 820.

The converter embodiment described is not in any way restrictive and represents only one possible specific embodiment of a converter according to the invention.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A flux converter for converting an input-side AC voltage into an output-side DC voltage to provide a power factor correction, comprising:
   a transformer having at least two serially arranged primary windings;
   a secondary winding wound in a same direction as the plurality of serially arranged primary windings;
   a storage capacitor in series with a first primary winding of the plurality of serially arranged primary windings;
   a first switch for switching the storage capacitor to the input-side AC voltage through rectification elements in a clocked manner; and
   a second switch for switching a second primary winding of the plurality of serially arranged primary windings to the storage capacitor in a clocked manner.

2. The flux converter as claimed in claim 1, further comprising:
   a filter capacitor unit connected to a conductor of the input-side AC voltage; and
   rectification elements arranged downstream of the filler capacitor unit.

3. The flux converter as claimed in claim 2, further comprising:
   a secondary-side rectifier circuit;
   a secondary-side flux choke;
   an output capacitor connected to the secondary winding by the secondary-side rectifier circuit and the secondary-side flux choke; and
   a secondary-side freewheeling diode connecting the output capacitor to the secondary-side flux choke.

4. The flux converter as claimed in claim 1, further comprising:

a secondary-side rectifier circuit;
a secondary-side flux choke;
an output capacitor connected to the secondary winding by the secondary-side rectifier circuit and the secondary-side flux choke; and
a secondary-side freewheeling diode connecting the output capacitor to the secondary-side flux choke.

5. The flux converter as claimed in claim 1, further comprising:
a primary-side freewheeling diode arranged parallel to a series circuit consisting of the storage capacitor and the first primary winding of the plurality of serially arranged primary windings.

6. The flux converter as claimed in claim 5, further comprising:
a first auxiliary winding magnetically coupled to the first primary winding of the plurality of serially arranged primary windings;
wherein the first auxiliary winding is arranged in series with the primary-side freewheeling diode in parallel to the storage capacitor.

7. The flux converter as claimed in claim 1, further comprising:
a freewheeling path having a primary-side freewheeling diode which taps the first primary winding of the plurality of serially arranged primary windings.

8. The flux converter as claimed in claim 1, wherein a link between the plurality of primary windings is connected to a first terminal of the storage capacitor, a second terminal of the storage capacitor being connected to a reference potential; and wherein a series circuit consisting of a second primary winding of the plurality of serially arranged primary windings and the second switch is arranged parallel to the storage capacitor.

9. The flux converter as claimed in claim 8, further comprising:
a second diode arranged in series with the second switch, a conducting direction of the second diode being opposite to a conducting direction of a parallel diode of the second switch.

10. The flux converter as claimed in claim 9, further comprising:
a first current sensing resistor arranged between a second terminal of the storage capacitor and the reference potential; and
a second current sensing resistor arranged between the second switch and the second terminal of the storage capacitor.

11. The flux converter as claimed in claim 8, further comprising:
a first current sensing resistor arranged between a second terminal of the storage capacitor and the reference potential; and
a second current sensing resistor arranged between the second switch and the second terminal of the storage capacitor.

12. A method for operating a flux converter for converting an input-side AC voltage into an output-side DC voltage to provide a power factor correction comprising a transformer having a plurality of serially arranged primary windings, a secondary winding wound in a same direction as the plurality of serially arranged primary windings, a storage capacitor in series with a first primary winding of the plurality of serially arranged primary windings, a first switch for switching the storage capacitor to the input-side AC voltage in a clocked manner by rectification elements and a second switch for switching a second primary winding of the plurality of serially arranged primary windings to the storage capacitor in a clocked manner, the method comprising:
transferring, through a first primary winding of the at least two primary windings, electrical energy introduced on the input-side to a secondary side of the flux converter in a first conducting phase of a work cycle and storing the transferred energy in the storage capacitor; and
transferring, through a second primary winding of the plurality of primary windings, electrical energy from the storage capacitor to the secondary side of the flux converter in a second conducting phase;
wherein the storage capacitor is connected in a clocked manner to the input-side AC voltage by the rectification elements to the first switch and the second primary winding of the at least two primary windings is connected in the clocked manner to the storage capacitor by the second switch.

13. The method as claimed in claim 12, wherein, during a conducting phase, at a beginning, the first switch is switched on and the second switch is switched off, and the second switch is subsequently switched on and the first switch is switched off, and the second switch remains switched on until a time at which a current through the second switch reaches a predetermined threshold value.

14. The method as claimed in claim 13, further comprising: regulating a ratio between on-time periods of the first switch and the second switch such that a mean voltage at the storage capacitor remains constant.

15. The method as claimed in claim 12, further comprising: regulating a ratio between on-time periods of the first switch and the second switch such that a mean voltage at the storage capacitor remains constant.

* * * * *